UNITED STATES PATENT OFFICE.

WALTER E. TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

PROCESS OF COLLECTING AND PURIFYING MINERALS.

1,421,862.     Specification of Letters Patent.     Patented July 4, 1922.

No Drawing.     Application filed April 9, 1920. Serial No. 372,447.

*To all whom it may concern:*

Be it known that I, WALTER E. TRENT, citizen of the United States, residing at Washington, in the District of Columbia, have invented certain new and useful Improvements in Processes of Collecting and Purifying Minerals, of which the following is a specification.

The invention relates to a process of collecting and purifying comminuted materials suspended in a body of liquid.

In the art of mineral separation, it has heretofore been the practice to collect metalliferous materials from gangue when the comminuted material is suspended in water, by adding to the mass a small amount of oil having a preferential affinity for the metalliferous substances. This oil upon a proper agitation forms a floating froth containing the metalliferous particles suspended upon the surface of the water. The froth generally contains air in the form of bubbles, oil, valuable minerals and exceedingly fine colloidal impurities such as silica which are not rejected with the gangue. These impurities are in a very fine state of division, being exceedingly troublesome when the collected metallic substances are to undergo a further treatment, and it has been long recognized by those skilled in this art that it would be a marked advance in the art if comminuted metalliferous substances could be expeditiously collected substantially free of fine colloidal impurities.

The present process contemplates the recovery and purification of comminuted metallic particles suspended in a body of water. To this end the process comprises the introduction to a mass of water containing metalliferous material and impurities in a fine state of division, treating agents having a decided affinity for the metalliferous substances and an excluding or repulsive effect upon the gangue, and exceedingly fine impurities originally contained in suspension in the water. The invention is based on the discovery that if comminuted impure substances suspended in water are treated with a pulverized carbonaceous material such as coal, and a relatively large quantity of hydrocarbon oil, the carbonaceous material, mineral and oil, will agglomerate in a thick heavy amalgam, while impurities in the nature of fine particles of silica, and the like will be excluded from the amalgam in suspension in the water. The coal employed as a treating agent is preferably finely pulverized, and the agglomeration of this coal with the oil will result in a displacement of natural detached impurities originally contained in the coal so that the resulting agglomerated product consists substantially of pure metalliferous substances, carbonaceous material, and a liquid hydrocarbon, the latter two ingredients constituting a fuel for a later smelting or other treatment of the metalliferous substances. It will be understood that the material to bring about the agglomeration must be subjected to an agitating action to cause an intimate commingling of the oil and carbon particles with the metalliferous substances.

In following the present process, if it is found desirable, the material such as the comminuted ore, gangue, and the like, may be treated by the usual oil flotation process with certain oils, or mixture of oils to give the desired frothing action, after which an additional supply of oil and the pulverized coal are introduced to the mass to form the amalgam of coal, hydrocarbon oil and metallic substances excluding the fine impurities and water. The materials collected by the usual flotation process are easier to amalgamate in carrying out the present process and any liquid hydrocarbon from benzol to heavy crude oil may be used for treating the frothing mass to collect the metallic substances and comminuted coal while the impure substances are rejected. The treatment of the flotation concentrates collected by the usual oil flotation process further purifies the same by expelling the water and fine earthy slimes originally contained in the frothy mass.

Under present day practices there is a great loss of fine metallic substances, especially steel and iron from mills and the like in the nature of "flue dust" or "fines". These materials are permitted to waste because of the difficulty heretofore experienced in recovering the metallic substances. Many attempts have been made to economically collect the metallic particles, but the proposed methods have generally met with disfavor because of the excessive expense involved, or the collection of a troublesome quantity of impurities with the fine metallic substances which renders the later treatment of the collected fines exceedingly difficult. The present invention, therefore, has in mind the recovery and purification of exceedingly fine metallic materials of the nature herein described, wherein the impurities and water are excluded, and the resulting product consists of an amalgam of comminuted metallic particles and fuel composed of carbonaceous particles and liquid hydrocarbon.

In carrying out the process I have successfully employed as a treating agent fuel oil, navy oil, crude oil, benzol and other liquid hydrocarbons used with pulverized carbonaceous material such as coal, preferably reduced to a very fine state of division.

To effect the recovery and purification of metalliferous materials in a finely divided state from impurities and water, I preferably introduce to a body of water containing approximately 100 pounds of comminuted metalliferous substance, approximately 50 pounds of liquid hydrocarbon oil which may be any of the oils hereinbefore mentioned. To this mass I introduce substantially 150 pounds by weight of pulverized coal, preferably of a fine state of division, and upon proper agitation the metalliferous substances, coal and liquid hydrocarbon agglomerate in a thick heavy mass excluding impurities and water. The quantity of water used in following the process is immaterial, it merely being expedient to use sufficient water to hold the comminuted materials in free suspension. After the agitation of the materials containing the treating agents, the metalliferous and carbonaceous substances will collect, while the impurities and natural ash forming substances of the coal are rejected in suspension in the water by the liquid hydrocarbon oil. The pulverized carbonaceous material and the liquid hydrocarbon and the metalliferous particles have a preferential affinity for each other collecting in an amalgam from which the water carrying the rejected substances can be removed.

It will be observed that to collect the metallic substances forming the heavy amalgam, a substantial quantity of hydrocarbon oil is necessary, and also a material quantity of the powdered coal. If only a small quantity of oil is used, a froth would be formed containing the metalliferous substances as is the practice in the customary normal separation processes as now employed, but this froth would also contain colloidal impurities or slimes which offer considerable trouble when the metallic substances are undergoing a later treatment. It is therefore necessary to add the oil and comminuted carbonaceous material in sufficient quantities to produce an amalgam, thus effecting the rejection or expulsion of the water and suspended colloidal impurities or sludge. When the metalliferous substances of the mass are to undergo a later heat treatment the amalgamated comminuted carbonaceous material and the liquid hydrocarbon produce the necessary material to bring about a smelting or heat treatment of the contained metallic substances.

For the purpose of illustrating the process I have herein disclosed treating agents which have been found to be highly successful in use, but it will of course be understood that other oils and comminuted carbonaceous agents than those herein disclosed may be successfully employed, so long as they possess the property of collecting the metalliferous substances from the impurities and water, and also that the relative quantities of the treating agents may decidedly vary, without departing from the spirit of the invention.

Having thus described the invention, what I claim is:

1. The process of collecting minerals suspended in water, consisting in mixing with the mineral a hydrocarbon oil and a comminuted carbonaceous material, in agitating the mixture until the mineral comminuted carbonaceous material and liquid hydrocarbon oil agglomerate, substantially free from froth and in then separating the agglomerated mass from the water.

2. The process of collecting comminuted minerals, consisting in separating the minerals from impurities by introducing to the minerals while suspended in water an oil and a comminuted carbonaceous substance, and in agitating the mixture to cause the comminuted minerals, carbonaceous material, and liquid hydrocarbon to agglomerate substantially free from froth excluding water and impurities.

3. The process of concentrating powdered ore, which consists in separating ore from gangue by introducing to water containing the ore and gangue, an oil and comminuted carbonaceous material, in agitating the mass to cause the oil, comminuted carbonaceous material and ore to agglomerate substantially free from froth, and in removing the agglomerated mass from the water.

4. The process of concentrating comminuted minerals consisting in mixing the comminuted minerals with water, in adding to the mixture treating agents of oil and comminuted carbonaceous matter, in agitating the mass to cause an agglomeration of the mineral, carbonaceous matter and oil substantially free from froth, and an expulsion of water and suspended impurities.

5. The process of collecting comminuted ores, consisting in separating ore from gangue by introducing to the ore and gangue suspended in water a quantity of oil and carbon particles, in agitating the mass to cause the ore, carbon particles and oil to form a relatively plastic agglomerate, expelling the water having the gangue and impurities in suspension therein, and in removing the agglomerated mass from the water and its impurities.

6. The process of collecting comminuted ore which consists in separating ore from impurities by introducing to water in the following proportions approximately one hundred pounds of comminuted ore and its impurities, substantially fifty pounds of a liquid oil and one hundred and fifty pounds of pulverized coal, in agitating the mass to cause an agglomeration of the metalliferous substances, the liquid oil and the comminuted coal and an expulsion of the impurities and water from the agglomerated mass.

7. The process of treating minerals sustained in water, which comprises mixing with comminuted mineral a pulverized treating agent and a treating liquid, in agitating the substances to cause an agglomeration of the mineral particles, and the pulverized and liquid treating agents substantially eliminating froth and water from the agglomerated mass.

8. The process of separating minerals from gangue while contained in water, which consists in mixing with the wet comminuted mineral and gangue a liquid treating agent and a comminuted carbonaceous substance, and in commingling the mass until the liquid treating agent, the comminuted carbonaceous substances and the mineral combine in an agglomerated mass, substantially free from froth and water, excluding from the mass gangue originally mixed with the mineral.

9. The process of purifying minerals mixed with a gangue and suspended in water, which consists in mixing with the pulverized mineral and gangue a carbonaceous liquid and a pulverized treating agent, and in agitating the mixture until the mineral, the liquid and the pulverized treating agent combine, and form an agglomerated mass substantially free of water and froth.

10. The process of collecting minerals suspended in water which consists in mixing with a comminuted mineral an oil and a comminuted carbonaceous material, and in agitating the mixture to cause an agglomeration of the mineral, the oil and comminuted material in a mass substantially free of froth.

11. The process of separating minerals from gangue suspended in water which consists in mixing with a comminuted mineral an oil and a comminuted carbonaceous material, and in agitating the mixture to cause an agglomeration of the mineral, the oil and comminuted material in a substantially firm mass.

12. The process of purifying minerals, which comprises treating comminuted minerals containing gangue while suspended in water with treating agents consisting of a liquid, and a pulverized substance, and in agitating the mass to cause an agglomeration of the mineral substances, the liquid and the pulverized treating agent, said agglomeration being substantially free of froth, water and gangue.

13. The process of treating a froth containing oil and a comminuted mineral, which consists in introducing into the froth a liquid treating agent and a comminuted substance to form a relatively firm agglomerated mass of the mineral, the liquid treating agent and the comminuted substance, substantially free from froth.

14. The process of treating a froth suspended in water and containing oil and mineral with impurities which consists in introducing into the froth a liquid treating agent and a comminuted substance and in agitating the mass to cause a relatively firm agglomeration of the mineral, the liquid treating agent and the comminuted substance, substantially free from froth, and an expulsion of the impurities.

15. The process of treating a froth, containing a mineral and oil with fine impurities, which consists in introducing to the froth treating agents comprising oil and a comminuted carbonaceous material, and in agitating the mass to cause an agglomeration of the oil, comminuted material, and mineral, substantially free from froth.

16. A process for the separation of minerals, which comprises mixing with finely divided mineral substances while suspended in water a pulverized treating agent, and a liquid treating agent, and in commingling the substances to cause the comminuted and liquid treating agents to combine with the mineral forming an agglomeration substantially free of froth and water.

In testimony whereof I affix my signature.

WALTER E. TRENT.